(12) United States Patent
Marsden et al.

(10) Patent No.: US 10,623,253 B2
(45) Date of Patent: Apr. 14, 2020

(54) PROVISION AND RETRIEVAL OF DEVICE STATUS INFORMATION

(71) Applicant: Eseye Limited, Surrey (GB)

(72) Inventors: Ian Marsden, Surrey (GB); Paul Marshall, Surrey (GB)

(73) Assignee: Eseye Limited (GB)

( * ) Notice: Subject to any disclaimer, the term of this patent is extended or adjusted under 35 U.S.C. 154(b) by 305 days.

(21) Appl. No.: 15/456,847

(22) Filed: Mar. 13, 2017

(65) Prior Publication Data

US 2018/0159726 A1 Jun. 7, 2018

(30) Foreign Application Priority Data

Dec. 2, 2016 (GB) .................................. 1620489.3

(51) Int. Cl.
*G06F 15/16* (2006.01)
*H04L 12/24* (2006.01)
(Continued)

(52) U.S. Cl.
CPC ........ *H04L 41/082* (2013.01); *G06F 11/1004* (2013.01); *G06F 15/16* (2013.01);
(Continued)

(58) Field of Classification Search
USPC ........................................................ 709/229
See application file for complete search history.

(56) References Cited

U.S. PATENT DOCUMENTS 6,606,643 B1 * 8/2003 Emens .................... H04L 29/06
709/200
7,069,325 B1 * 6/2006 Lu ......................... H04L 67/125
709/217
(Continued)

OTHER PUBLICATIONS 17204766.4; Extended European Search Report, dated Feb. 5, 2018; 10 pages.
(Continued)

*Primary Examiner* — Alicia Baturay (74) *Attorney, Agent, or Firm* — Kilpatrick Townsend & Stockton LLP (57) ABSTRACT

A device, system and web page for providing status information of a first device to a client device are provided together with a method for retrieving status information of the first device from the client device. The first device comprises an integral web server arranged to provide a web page. The web page comprises one or more standard elements available for download from the first device or from a second device. The web page also comprises at least one variable element specific to the first device including the status information of the first device. The method comprises sending a request for the web page from the client device to the first device. The method further comprises receiving at the client device, from the first device, an initial web component comprising an initial script. The method further comprises running the initial script at the client device to: attempt to access a first test element from the first device; attempt to access a second test element from the second device; determine, based on an outcome of the attempts to access the first test element and the second test element, whether to download the one or more standard elements from the first device or the second device; and download the one or more standard elements from the determined device and the at least one variable element from the first device. The method further comprises displaying the web page on the client device.

17 Claims, 6 Drawing Sheets

(51) Int. Cl.
*G06F 16/951* (2019.01)
*G06F 16/957* (2019.01)
*G06F 16/95* (2019.01)
*G06F 11/10* (2006.01)
*H04L 12/26* (2006.01)
*H04L 29/08* (2006.01)

(52) U.S. Cl.
CPC ............ *G06F 16/95* (2019.01); *G06F 16/951* (2019.01); *G06F 16/957* (2019.01); *H04L 43/0888* (2013.01); *H04L 67/02* (2013.01); *H04L 67/06* (2013.01); *H04L 67/34* (2013.01)

(56) References Cited

U.S. PATENT DOCUMENTS

| | | | | |
|---|---|---|---|---|
| 7,376,730 B2* | 5/2008 | Pandya | ................ | H04L 67/42 340/500 |
| 7,516,223 B2* | 4/2009 | Whitehead | ............ | H04L 67/025 709/203 |
| 7,676,581 B2* | 3/2010 | Isaacs | ................ | H04L 67/02 709/219 |
| 7,779,300 B2* | 8/2010 | Moon | ............... | G06F 11/0709 714/25 |
| 7,889,852 B2* | 2/2011 | Whitehead | ............ | H04L 29/06 379/207.15 |
| 8,477,639 B2* | 7/2013 | Sewall | ................ | H04L 43/045 370/252 |
| 8,612,608 B2* | 12/2013 | Whitehead | .......... | H04L 63/0442 709/220 |
| 8,706,803 B1* | 4/2014 | Whitcomb | .......... | G06F 16/9574 709/203 |
| 8,959,028 B2* | 2/2015 | Canter | ................ | H04L 67/02 705/16 |
| 8,984,144 B2* | 3/2015 | Schapira | ............. | H04L 67/2804 709/227 |
| 9,065,835 B2* | 6/2015 | Grigsby | ................ | H04L 67/104 |
| 9,094,280 B2* | 7/2015 | Wood | ................... | H04L 43/045 |
| 9,112,897 B2* | 8/2015 | Teo | ...................... | G06F 21/566 |
| 9,712,959 B2* | 7/2017 | Haoyang | ............. | H04B 17/318 |
| 2002/0107760 A1* | 8/2002 | Chiba | ................... | G06Q 30/06 705/26.81 |
| 2003/0208570 A1* | 11/2003 | Lapidous | ............... | H04L 29/06 709/222 |
| 2005/0021839 A1 | 1/2005 | Russell | | |
| 2005/0198248 A1* | 9/2005 | Morimoto | ........... | G06F 17/5068 709/223 |
| 2006/0087682 A1* | 4/2006 | Lee | ..................... | H04N 1/0035 358/1.15 |
| 2008/0301300 A1* | 12/2008 | Toub | ..................... | H04L 67/06 709/227 |
| 2009/0172658 A1* | 7/2009 | Wood | ..................... | G06F 8/61 717/174 |
| 2011/0238828 A1* | 9/2011 | Grigsby | ............... | H04L 67/104 709/224 |
| 2013/0185318 A1 | 7/2013 | Hirai | | |
| 2016/0267520 A1* | 9/2016 | Kalish | ................ | G06Q 30/0242 |
| 2018/0159726 A1* | 6/2018 | Marsden | ............. | G06F 16/951 |

OTHER PUBLICATIONS 17204766.4; Communication pursuant to Article 94(3), dated Dec. 11, 2018; 5 pages.

* cited by examiner

PROVISION AND RETRIEVAL OF DEVICE STATUS INFORMATION

CROSS-REFERENCE TO RELATED APPLICATIONS

The present application claims priority under 35 U.S.C. § 119 to British Patent Application No. 1620489.3, filed Dec. 2, 2016, which is hereby incorporated by reference in its entirety.

FIELD OF THE INVENTION

This invention relates to methods, devices and systems for providing status information from a first device to a client device and for retrieving status information from the first device to the client device.

BACKGROUND OF THE INVENTION

Many kinds of apparatus are known which can connect to servers for machine-to-machine communication. Purely by way of example, such types of apparatus may include vending machines, medical monitoring machines, and many others. In many cases, the apparatus is designed to connect through different types of network, including for example mobile networks and wired networks.

There is frequently a need to remotely access status information of such apparatus. For example, where the apparatus is a vending machine, the status information of the apparatus might include information about the stock levels of products in the machine. An operator of the vending machine may then remotely monitor this status information to determine when the vending machine needs restocking. The status information may include information about a current configuration of the apparatus. For example, the status information of the vending machine might include information about the prices that are currently configured for each kind of product.

Increasingly, access to such status information is achieved by incorporating an integral web server in the apparatus. The integral web server delivers a web page which can be read and updated as required to provide the status information. As is known, web pages may include indications of a number of elements (or resources) which are included as a part of the web page. Increasingly, the web pages that are provided by such integral web servers are not simple text-only web pages but are instead web pages of significant complexity including significant graphical complexity involving elements such as images, animations, videos or sounds, as well as other elements which affect how the web page is displayed and/or behaviour, such as scripts or style sheets. The provision of more complex web pages to provide the status information of apparatus is generally desirable as it enables a more comprehensive user interface to be provided which provides greater functionality to the user and enables the user to more readily navigate the user interface and understand the status information that is being provided.

The web pages that are provided by the integral web server may allow a user to modify the configuration of the machine. As discussed above, the status information may include configuration information about the configuration of the apparatus. In addition to displaying the configuration information, the web page may allow the configuration information to be modified and updated on the apparatus. The apparatus may then operate in accordance with the updated configuration. For example, the status information displayed by the web page might include information about the prices that are currently configured for each kind of product in a vending machine. The web page may include components which enable a user to change the prices that are configured for each product type and send these back to the integral web server of the vending machine to allow the vending machine's configuration to be updated accordingly. The vending machine may then operate by selling the products at the newly configured prices.

Web pages are normally retrieved and viewed using a standard browser program operating on a client computer system. In order to retrieve a particular web page, a browser will typically request the web page from a web server, such as the integral web server of the apparatus, which will transmit the web page in response. Following receipt (or retrieval) of the web page, the browser will ordinarily proceed to retrieve the elements that are included in the web page so as to display the web page in its entirety. Therefore, for a complex web page including a large number of elements (such as images, scripts and so on), the retrieval of the web page may involve issuing multiple requests to a web server in order to fully retrieve the web page in its entirety (i.e. including all of its included elements).

The use of a web page served by an integral web server of the apparatus to provide a user interface to the apparatus (i.e. to provide the status information of the apparatus and possibly allow the configuration of the apparatus to be changed) means that the apparatus can be managed (i.e. monitored and/or configured) from any computer system which can connect to the integral web server via some network of any kind and which is capable of running a standard web browser program. This means that the computer system from which the apparatus is managed does not need to be specially configured in any way, improving the flexibility of managing the apparatus.

Generally, the provision of complex web pages does not cause any issues where the web pages are accessed by fast local wired networks. However, they can cause difficulty where the web page is accessed over a slow data connection. This is a particular issue in the case of deploying remote devices where the connection is by a low cost service, such as a GPRS service, either to keep the cost of connectivity down or in locations where high performance mobile data connections such as 4G connections are not available. In such situations, the slow data connection may result in very long load times for a complex web page where the elements of the web page take a long time to be retrieved (and, in some cases, may not even be retrievable at all).

Although it might be thought that this problem could be addressed simply by adapting the integral web servers to display simpler web pages, this is frequently not practical. For example, in the case of apparatus requiring mobile or wired connectivity, it is typical to include a router device provided from a third party supplier in the apparatus. Such a router device typically includes an integral web server hard coded into the device—typically a single chip—and it is not normally possible to update the web server integrated into the router chip to display non-standard status information. It will be appreciated that many different stand-alone devices such as chips may be incorporated into apparatus.

Such devices may be mobile router devices. One way of providing remote connectivity to an apparatus is through the integration (or inclusion) of such a mobile router device within the apparatus. These mobile router devices can connect to a local network and a mobile network and function to forward packets between the two networks. This enables devices which are connected to the local network to communicate with remote devices via the mobile network through the router and vice-versa. The router device may have an internal web server which may provide status information about the router device itself. This status information may include, for example, information about which networks the router device is connected to and the status of those networks, such as other devices that are accessible via those networks and a total data throughput that has been sent and/or received on each network. The web page that is served by the router's internal web server may allow the configuration of the router to be changed, such as for example to change the configuration of the networks to which the router is connected or to change rules relating to how the router device forwards data packets from devices on one network to devices on the other network.

Most modern relatively complex machines typically have a number of internal computer devices which control various aspects of the machine's functioning. These internal computer devices are typically linked together via an internal wired network. A router device may therefore be connected to this internal wired network to provide mobile connectivity to the machine and its internal computer devices. This means that the remote computer devices are enabled to communicate with the internal computer devices of the machine and vice-versa. This enables the machine in which a router device is embedded to be deployed anywhere (with mobile network coverage) whilst maintaining connectivity with a remote computer system or network of computer systems.

As an example, consider a coffee vending machine. The coffee vending machine may comprise a number of different internal computer devices, such as a payment terminal, a drink dispensing control device and a user interface controller all interconnected via an internal wired network. The user interface controller may, for example, be arranged to display an output showing a range of drinks options on a touch screen of the coffee vending machine and may receive user input in response to the user touching the options on the touch screen. After a user has selected a drinks option, the user interface controller may cause the touch screen to display an instruction to the user to make a payment using the payment terminal and may send a signal to the payment terminal instructing it to start a process for taking a payment of a particular amount. Once the payment has been made, the payment terminal may issue a signal back to the user interface controller indicating that the payment has been made. The user interface controller may then cause the touch screen to display an indication to the user that the payment has been successful and may send a signal to the drink dispensing control device to start a process for dispensing the user's chosen drink. Once the drink dispensing control device has finished dispensing the drink, it may send a signal back to the user interface controller which may in turn cause the touch screen to display a message to the user that their drink is ready to be taken. Of course, other interactions may occur between the different components of the machine to achieve the same result.

A router device may be embedded (or integrated or included) in such a machine to allow the machine to be remote managed (i.e. monitored and/or configured). The machine in which a router device is embedded may be remotely managed thorough the router device in a couple of different ways.

Firstly, internal computer devices of the machine may have their own integral web servers for providing status information relating to their operation. For example, the payment terminal may have an internal web server which provides a web page containing a log of recent transactions that have been processed (or attempted). Similarly, the drink dispensing control device may have its own internal web server which provides a web page containing a current stock level of each type of drink. Therefore, a remote computer system may access the status information of those devices directly. In other words, the remote computer system may send a request for the web page from a particular internal computer system (such as the payment terminal or the drink dispensing control device) via the mobile network to the router which forwards the request via the internal network to the internal computer system. The internal computer system may then send the web page in response to the request by sending the web page over the internal network to the router device, which in turn forwards it over the mobile network to the remote computer device. As discussed above, the web pages may also allow the configuration of the internal computer systems to be modified.

Alternatively, the router device may collect status information from the internal computer systems via the local network and include this status information in web pages that are provided by its own internal web server. The router device can therefore provide status information about the machine in which it is embedded (or integrated). Furthermore, the web pages provided by the router device may enable the operation of the machine to be configured. For example, the machine status information included in the web pages provided by the router device may include configuration information for one or more of the internal computer systems. The web page may enable the user to modify the configuration information and send the modified configuration information back to the router device which in turn modifies the configuration of the associated internal computer systems.

In any case, it is possible for the status and operation of the machine to be remotely monitored and/or configured. For example, the status information of the coffee machine might include information such as its current state (e.g. awaiting user interaction, awaiting payment or dispensing drink), any recent errors that have been encountered (e.g. an error log), statistics about the numbers of each type of drink that have been dispensed, possibly together with statistics about the times of day or days of the week (or month) that each type of drink are dispensed, and so on. Similarly, the machines configuration may be altered remotely, such as, for example by adjusting the prices that are associated with each type of drink, or changing an indication of the types of drink that are available from the machine. Having the ability to remotely monitor and/or configure the machine can be of great use to an operator of the machine. For example, by having access to statistics about the numbers of each type of drink that have been dispensed and statistics about the times of the day or days of the week that each type of drink is dispensed, an operator may be able to better schedule re-supply or maintenance visits to the machine, improving their operating efficiency. Similarly, an operator may be able to use such statistics to adjust the types of drinks (or ratios thereof) that are stocked in each machine based on the demand (possibly adjusted to account for any seasonal variations) for each type of drink.

It should be appreciated that in many cases in such applications an operator will have a very large number of remote devices (or machines). For example, in the case of so-called "smart meters" a utility supplier may have very large numbers of remote devices connected to a central server by means of low cost GPRS mobile data connections. Such smart meters may be configured locally by connecting a suitable client device to the smart meter but it is not practical to send an operative to do so to configure each and every smart meter operated by a utility company, so instead it is necessary to carry out configuration remotely using a mobile data connection. If it takes a minute to download the configuration web page over the mobile data connection, this may be prohibitive to a utility company trying to reconfigure hundreds of thousands of smart meters, if not more. The same applies to the case where it is simply required to download configuration data from large numbers of devices.

There is thus a need for improved methods and apparatus to address this issue.

SUMMARY OF THE INVENTION

The inventors of the present invention have identified a need to improve the way in which web pages containing status information are provided and retrieved from devices, such as those that are embedded in machines.

According to a first aspect of the invention, there is provided a method for retrieving status information of a first device from a client device. The first device comprises an integral web server arranged to provide a web page. The web page comprises one or more standard elements available for download from the first device or from a second device. The web page also comprises at least one variable element specific to the first device including the status information of the first device. The method comprises sending a request for the web page from the client device to the first device. The method further comprises receiving at the client device, from the first device, an initial web component comprising an initial script. The method further comprises running the initial script at the client device to: attempt to access a first test element from the first device; attempt to access a second test element from the second device; determine, based on an outcome of the attempts to access the first test element and the second test element, whether to download the one or more standard elements from the first device or the second device; and download the one or more standard elements from the determined device and the at least one variable element from the first device. The method further comprises displaying the web page on the client device.

The client device is enabled to perform the method without requiring any specific advance configuration of the client device as all that is initially needed is, for example, a standard web browser to allow the client device to retrieve the web page in order with an initial script providing the instructions for carrying out other steps of the method. By running the initial script, the client device attempts to access test elements from both the first device and the second device. These attempts enable the client device to determine which device is the most appropriate device for downloading the one or more standard elements from based on the current conditions experienced by the client device. This means that the method allows the client device to choose the most appropriate device to download the one or more standard elements from regardless of whether the client device is connected to the first device via a local (e.g. wired) connection or a remote (e.g. wireless or mobile) connection.

By including this determination in a script downloaded from the first device the client device is enabled to make the determination without requiring any special software on the client device other than a web browser capable of running the web script. This allows for flexibility.

The determination of which device to download the one or more standard elements from may be based, at least in part, on an assessment of a respective available throughput for retrieving elements from each of the first and second devices based on a respective time taken to retrieve each of the first and second test elements.

It will be appreciated that a first network route which may be used to connect the client device to the first device may be different from a second network route which may be used to connect the client device to the second device. The two network routes may share common portions. For example, portions of both routes may use the same network. However, at least one portion of either the first network route and/or the second network route may be different from the other. For example, the first network route may include a first portion using a first network (such as a local wired network) and a second portion involving a second network (such as a mobile network) whilst the second network route may simply involve a single portion using the first network. Alternatively, the first and second network routes may be completely different from one another. For example, the first network route may be provided via a first network (such as a mobile network), whilst the second network route may be provided via a second network (such as a local wired network). Therefore, it is likely that one of the network routes will be better suited to providing elements of the web page to the client device than the other. The present invention provides an efficient and flexible way of retrieving a web page which involves retrieving the standard elements of the web page via the best network routes (i.e. with the best available throughput) as experienced by the client in its current position in the network (i.e. either local to, or remote from, the first device).

The first and second test elements may be the same as each other and may correspond to one of the one or more standard elements of the web page. Whilst the first and second test elements need not be the same as each other, the determination of which device to download the one or more standard elements from may be simplified if they are the same. For example, the determination may simply be based upon which of the test elements was provided in the shortest amount of time following the access attempt, which may be reduced yet further to simply determining which of the test elements was provided first if the access attempts are made substantially simultaneously. Similarly, whilst the first and second test elements need not correspond to one of the one or more standard elements of the web page, it may help to reduce the time taken to fully retrieve the web page if they do correspond to one of the one or more standard elements of the web pages. This is because if the test elements are retrieved following the access attempt, it may reduce the number of standard elements of the web page that are left to be retrieved. It will be appreciated that the standard elements to which the first and second test elements correspond might be different from one another in which case, if the test elements are retrieved as part of the access attempts, the number of standard elements left to retrieve may be reduced yet further.

The second device may be located at a predetermined network address.

The method may further include calculating a check code in the form of a checksum or hash code from the standard elements on the first device, calculating the same check code from the standard elements on the second device, and allowing the use of the elements from the second device in the step of displaying the web page only if the check codes match.

According to a second aspect of the invention, there is provided a device for providing status information to a client device. The device comprises an integral web server configured to provide a web page to the client device in response to receiving a request from the client device. The web page comprises one or more standard elements available for download from the device or from a second device. The web page further comprises at least one variable element specific to the device including the status information of the device. The provision of the web page includes providing an initial web component comprising an initial script which, when run by the client device, causes the client device to: attempt to access a first test element from the device; attempt to access a second test element from the second device; determine, based on an outcome of the attempts to access the first test element and the second test element, whether to download the one or more standard elements from the device or the second device; and download the one or more standard elements from the determined device and the at least one variable element from the device.

The device may further comprise a first network interface configured to enable the device to communicate via a first network. The first network is preferably a mobile network. The device may further comprise a second network interface configured to enable the device to communicate via a second network. Preferably the second network is a wired network. The integral web server may be further configured to provide the web page in response to a request received from the client device via either of the network interfaces.

The invention may be particularly beneficial for devices to which the client device can connect in several different ways to retrieve the status information from the web page via the integral web server. For example, such devices may allow the client device to connect via a local (e.g. wired) connection or via a remote (e.g. wireless or mobile) connection. In particular, the initial script included in the initial web component of the web page enables the client device to determine which device is the most appropriate device for downloading the one or more standard elements from based on the current conditions experienced by the client device. This means that the client device will download the one or more standard elements from the most appropriate device regardless of whether the client device is connect to the first device via a local (e.g. wired) connection or a remote (e.g. wireless) connection.

The device may be further configured to function as a router to forward data packets between the first network and the second network.

The device may be arranged to base its operation, at least in part, on configuration data stored within the device. The at least one variable element of the web page may comprise the configuration data and the web page may be further configured to enable the configuration data to be modified.

According to a third aspect of the invention, there is provided a system for providing status information from one or more devices to a client device. The system comprises one or more devices according to the second aspect of the invention. The one or more standard elements of the respective web pages of each of the one or more devices are common to the respective web pages of all of the one or more devices. The system further comprises a second device configured to make the one or more standard elements available for download.

The one or more devices may be a plurality of devices, preferably numbering more than 100 or more than 1000.

According to a fourth aspect of the invention, there is provided a web page. The web page comprises one or more standard elements. The web page further comprises at least one variable element specific to a first device to which the web page relates and including status information of the first device. The web page further comprises an initial web component comprising a script which, when executed by a processor of a device receiving the web page, causes the device to: attempt to access a first test element from the first device; attempt to access a second test element from a second device; determine, based on an outcome of the attempts to access the first test element and the second test element, whether to download the one or more standard elements from the first device or the second device; and download the one or more standard elements from the determined device and the at least one variable element from the first device.

The one or more standard elements may comprise one or more of: an image, an animation, a video, a sound file, a script or a style sheet, and wherein the variable element comprises status and/or configuration data associated with the operation of the first device.

According to a fifth aspect of the invention, there is provided a computer-readable medium storing a web page according to the fourth aspect.

BRIEF DESCRIPTION OF THE DRAWINGS

Embodiments of the invention will now be described, by way of example only, with reference to the accompanying drawings, in which.

DETAILED DESCRIPTION OF EMBODIMENTS OF THE INVENTION

In the description that follows and in the figures, certain embodiments of the invention are described. Like or similar components are given the same reference numbers in different embodiments, and the description relating thereto is not necessarily repeated. The drawings are schematic and not to scale. It will be appreciated that the invention is not limited to the embodiments that are described and that some embodiments may not include all of the features that are described below. It will be evident, however, that various modifications and changes may be made herein without departing from the broader spirit and scope of the invention as set forth in the appended claims.

Figure 1:
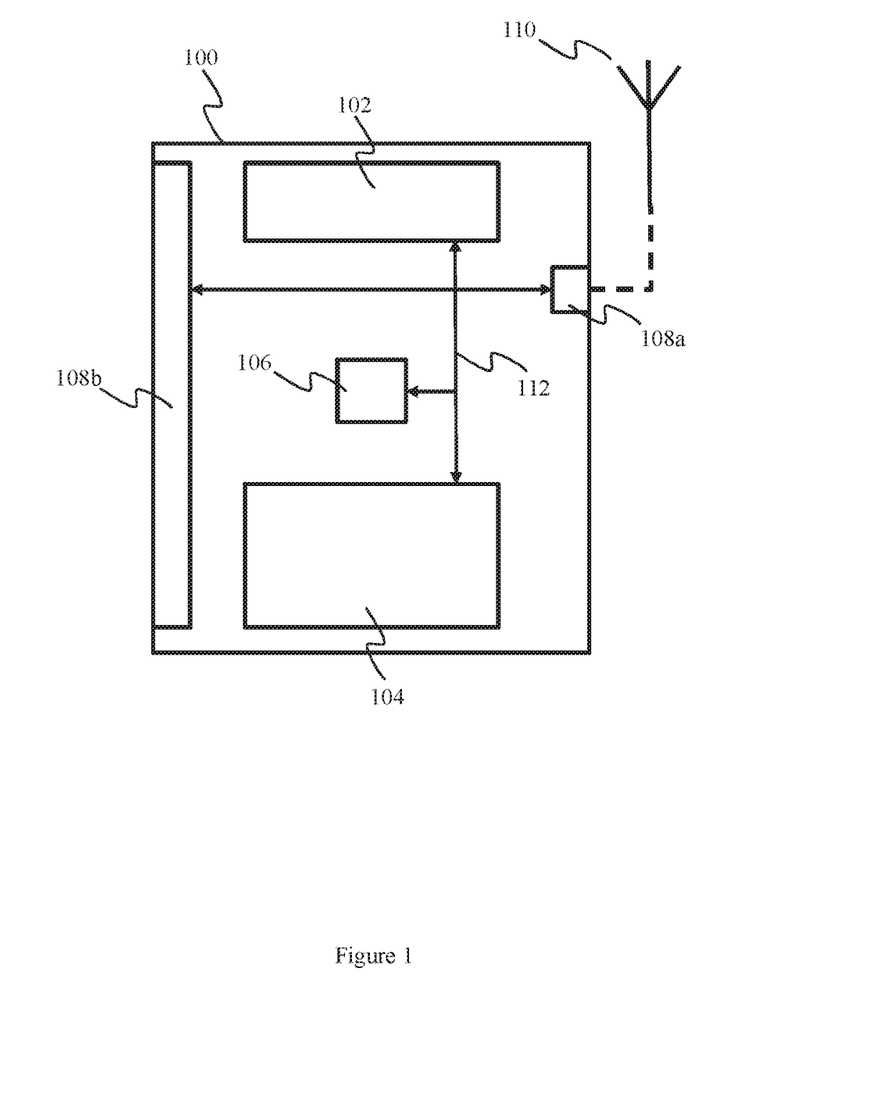
FIG. 1 schematically illustrates an exemplary device according to an embodiment of the invention.

FIG. 1 schematically illustrates an exemplary device 100 according to an embodiment of the invention. The device 100 comprises a computer-readable storage medium 102, a memory 104, a processor 106 and two network interfaces 108a and 108b, which are linked together over one or more communication busses 112.

A first network interface 108a of the device 100 is a mobile network modem, which enables the device 100 to communicate with a mobile network through an antenna 112 which is connected to the mobile network modem.

A second network interface 108b of the device 100 is a wired network interface which enables the device 100 to communicate via a wired network.

The computer-readable storage medium 102 and/or memory 104 store programs (or software or code) and/or data which can be executed by the processor 106 to cause the device 100 to carry out various operations required of it. The computer-readable storage medium 102 and/or memory 104 may store configuration data upon which at least partly influences the operation of the device 100. For example, some of the programs may read the configuration data and determine which operations are to be performed based on specific values contained in the configuration data.

The device 100 has an integral (or inbuilt) web server which is configured to provide a web page in response to requests received from other device via a network to which the device 100 is connected through one of its one or more network interfaces 108. The web server may be implemented as one of the programs stored on the computer-readable storage medium 102 and/or memory 104.

The web page that is provided by the integral web server includes one or more standard elements, at least one variable element variable element and an initial web component which comprises a script. The web page may be a static web page retrieved from the computer-readable storage medium 102 and/or memory 104, or may be dynamically generated in response to a particular request from one or more scripts and/or programs stored in the computer-readable storage medium 102 and/or memory 104.

The elements of the web page (i.e. the one or more standard elements and/or the at least one variable element) may be any kind of element, including, for example, text, data, animation, video or sound files, as well as other elements, which affect how the web page is displayed and/or behaviour, such as scripts or style sheets. In order for the web page to be displayed properly (i.e. completely), all of the elements of the web page, both the one or more standard elements and the at least one variable element will need to be retrieved by a client device. The at least one variable element of the web page is an element which is specific to (or dependent upon) the device 100 because it includes status information of that first device. The status information is information which is specific to the current operating state of the device. Since the status information is specific to the device 100, the status information may vary between devices and, as such, is not readily obtainable from any other source and will need to be retrieved from the device 100 to which the web page relates.

The device 100, may be configurable. That is to say, the device 100 may have configuration data stored in the computer-readable storage medium 102 and/or memory 104 upon which its operation is based. At least some of the programs operating on device 100 may read this configuration data and determine an appropriate course of action based on it. Therefore, by changing the configuration data stored on the device 100, the operation of the device 100 can be modified without having to modify any of the device's programs themselves. The status information that is included as the at least one variable element may include the configuration data (or other information which is indicative of the device's configuration). This may be provided, possibly in addition to other status information of the device, to allow the device's current configuration to be determined. Additionally, the web page may allow for the configuration data to be modified and sent back to the integral web server of the device. In this case, the integral web server may store (or modify) the configuration data on the device 100 in place of the existing configuration data. As a result, the web page may enable a user to modify the behaviour of the device 100 by changing the configuration data upon which its operation is based.

It will be appreciated that there are many different kinds of status information that may be included as the at least one variable element of the web page, such status information being specific to a particular device or machine. Furthermore, it will be appreciated that the device 100 might be a device other than a mobile router device which has integrated network interfaces and an integral web server to achieve the same functionality as embedding a mobile router device. Additionally, it will be appreciated that the device 100 need not have exactly two network interfaces, as illustrated by FIG. 1. Instead, the device 100 might only have a single network interface or more than two network interfaces.

The exemplary device 100 will now be discussed further in conjunction with FIG. 2 which schematically illustrates an exemplary system 200 in which the exemplary device 100 may be used according to the invention.

The system 200 comprises one or more devices 100, a client computer system (or device) 210 and an alternative (or secondary or second) device 220. There are two different operating modes or configurations in which the client computer system 210 may operate (labelled A and B on FIG. 2).

In a first operating mode, A, the client computer system 210 communicates with each of the one or more devices 100 via a mobile network 230 (i.e. through the first network interface 108a of the device 100). The client computer system 210 may be directly connected to the mobile network 230, such as by having its own on-board mobile network modem and antennae, enabling it to communicate with the mobile network 230. Alternatively, as shown in FIG. 2, the client computer system 210 may be indirectly connected to the mobile network 230 through another network 240, such as a local area network, wide area network or the internet. In any case, in this first operating mode, A, the client computer system 210 is able to request and retrieve web pages (and their constituent elements) from the integral web servers of the one or more devices 100 via the mobile network 230. This enables the client computer system 210 to remotely manage (i.e. monitor and/or configure) the one or more devices 100, which is particularly useful when the user of a client computer system 210 is at a location which is remote from the one or more devices 100 (for example, during routine management of the one or more devices 100).

In a second operating mode, B, the client computer system 210 communicates with a particular device 100 via a wired network connection (i.e. through the second network interface 108b of the device 100). The client computer system 210 may be directly connected to the second network interface 108b of the device 100 through a direct wired network connection 250. Alternatively, the client computer system 210 may be indirectly connected to the device 100 through a wired network (not shown). In any case, in this second operating mode, B, the client computer system 210 is able to request and retrieve web pages (and their constituent elements) from the integral web server of a device 100 via a wired network connection. This enables the client computer system 210 to locally manage (i.e. monitor and/or configure) the one or more devices 100, which is particular useful when the user of the client computer system 210 is at a location which is local to one of the devices 100 (for example, when installing or maintain the device 100). Whilst the client computer system 210 is communicating with one of the devices via a wired network connection in the second operating mode B, it may still maintain communication with the other devices through the mobile network 230 in the first operating mode A (that is to say, the client computer system 210 may operate in both modes simultaneously with respect to different ones of the one or more devices 100). However, the client computer system 210 need not necessarily be able to communicate with the other devices when communicating with one of the devices via a wired network connection in the second operating mode B.

The alternative device 220 is a server computer which also runs a web server. The alternative device 220 stores a copy of the one or more standard elements of the web page that is provided by the on-board web server of the devices 100. The standard elements of the web pages are those that are common across the web pages provided by the each of the devices 100. The standard elements are not, therefore, specific to (or dependent upon) each device 100 and are not expected to differ between one device 100 and another. Therefore, the alternative device 220 provides an alternative location from which the one or more standard elements of the web page can be downloaded. The client computer system 210 may be able to download the one or more standard elements of the web page from the alternative device 220. For example, as illustrated in FIG. 2, the client computer system 210 when operating in the first operating mode, A, is able to communicate with the alternative device 220 via the other network 240, without having to communicate via the mobile network 230. The client computer system 210 may also be able to communicate with the alternative device 220 when it is operating in the second operating mode, B. For example, the client computer system 210 may have a direct connection to the mobile network 230 via an on-board mobile network modem and antennae, or may be enabled to communicate with the mobile network 230 via the device 100 which may act to forward packets from the client computer system 210 to the mobile network 230 and vice-versa. The client computer system 210 may then access the alternative device 220 via the mobile network 230 and the other network 240. However, this need not be the case, and the client computer system 210 may equally be unable to communicate with the alternative device 220 when in the second configuration B.

Figure 2:
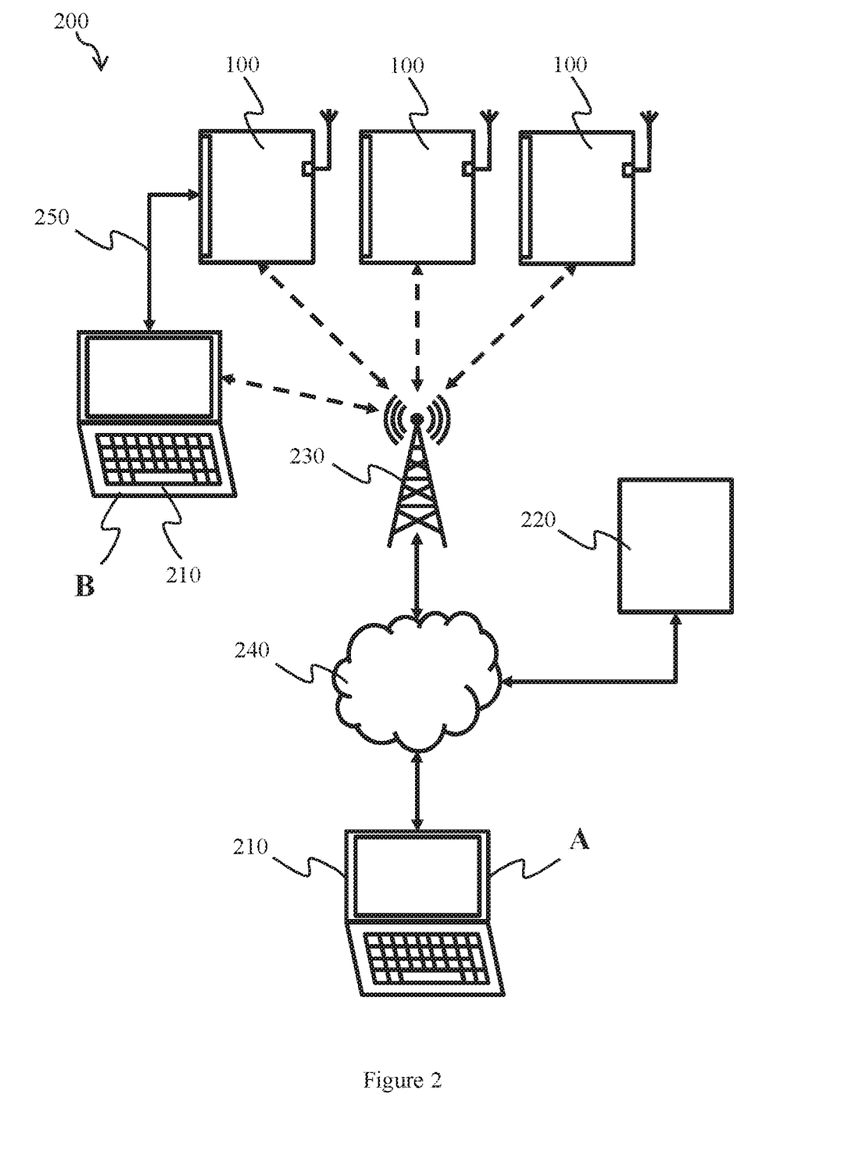
FIG. 2 schematically illustrates an exemplary system in which the exemplary device 100 may be used according to the invention.

Whilst the exemplary system 200 illustrated in FIG. 2 is shown with three devices 100, it will be appreciated that the number of devices 100 involved in the system 200 may, in some cases, be very large. For example, some systems may comprise more than 100 devices 100, whilst others may comprise 1000 devices 100 or more. The exemplary device 100 and the exemplary system 200 will now be discussed further in conjunction with FIG. 3.

Figure 3:
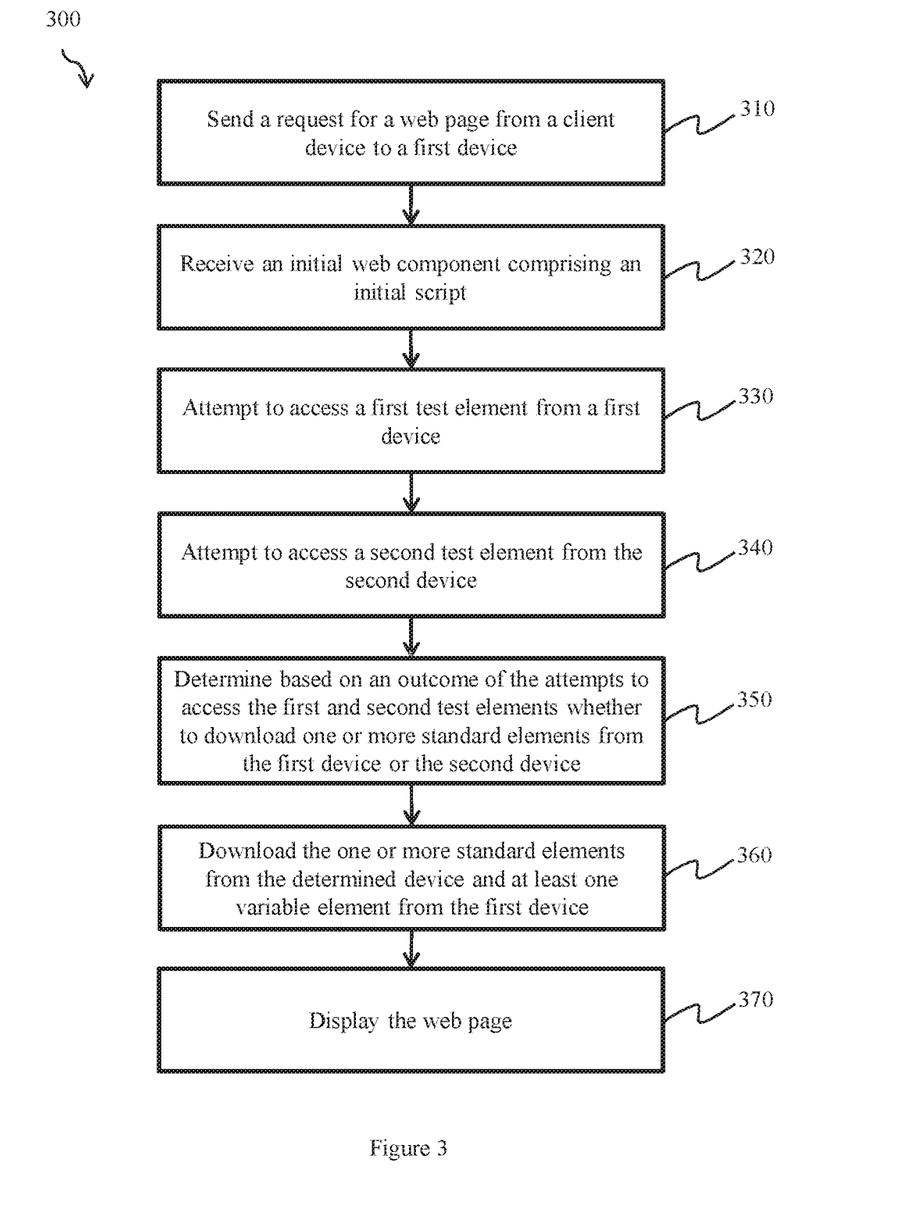
FIG. 3 schematically illustrates a method for retrieving the status information of a first device from a client device according to an embodiment of the invention.

FIG. 3 schematically illustrates a method 300 for retrieving the status information of a first device from a client device according to the invention. The method 300 is performed by the client computer system 210 to retrieve the status information from one of the devices 100, irrespective of whether it is in the first configuration A or the second configuration B.

At a step 310, the client computer system sends a request for the web page to the device 100. This request is processed by the integral web server of the device 100 which returns the web page in response. The web page which is provided by the device 100 includes one or more standard elements, at least one variable element which is specific to the device 100 and includes status information of the device 100, and an initial web component which comprises a script.

It will be appreciated that whilst the web page that is retrieved at step 310 may include one or more standard elements and at least one variable element, these are not retrieved together with the web page at step 310. Instead, the web page that is retrieved includes indications of the elements that are included in the web page. These elements will then need to be retrieved separately in order for the web page to be fully displayed.

The initial web component of the web page comprises a script which includes instructions for causing the browser to retrieve the one or more standard elements of the web page in accordance with the invention. The script may be written in any appropriate web scripting language, such as javascript.

At a step 320 of the method 300, the initial web component comprising the initial script is received. The initial web component may be included inline as part of the web page itself, in which case it is retrieved as part of the step 310 of retrieving the web page itself. Alternatively, the initial web component may be a separate element that is required to be fetched separately from the web page, in which case, the client computer system 210 may issue a separate request for the initial web component. In either case, the initial web component comprising the initial script is received by the method 300. It will be appreciated that the initial web component does not necessarily need to be the first element of the web page that is received (or retrieved or loaded). Instead, the initial web component is a web component that is loaded before the one or more standard elements of the web page are retrieved.

Having received the initial web component, the client computer system 210 will typically run the initial script. For example, the initial script may be interpreted by a browser program running on the client computer system 210. By running the initial script, the client computer system 210 is enabled to carry out the next steps of the method 300 to retrieve the one or more standard elements of the web page.

At a step 330 of the method 300, performed as part of a first step of resulting from running the initial script, the client computer system 210 attempts to access a first test element from the device 100. In other words, the script directs the client computer system 210 to attempt to access a particular location from which the first test element is available.

At a step 340 of the method 300, performed as part of a second step resulting from running the initial script, the client computer system 210 attempts to access a second test element from the alternative device 220. In other words, the script directs the client computer system 210 to attempt to access a particular location from which the second test element is available. It will be appreciated that in some configurations, the client computer system 210 may not be able to communicate with the alternative device 220, in which case, the outcome from attempting to access the second test element may result in a failure.

At a step 350 of the method 300, performed as part of a third step resulting from running the initial script, the client computer system 210 determines whether to download the one or more standard elements of the web page from the device 100 or the alternative device 220. The determination is based on outcome of the attempts to access the first and second test elements at steps 330 and 340 respectively. It will be appreciated that the attempts to access the first and second test elements need not result in the test element being downloaded to the client computer system 210. For example, the determination may be based on a response to the access attempt from the respective web servers of the device 100 and the alternative device 220. The determination may be that the device which responds first to the access attempt in a positive way (i.e. in a way which would indicate that the download of the test element from that device may be begin without any problems) is the device from which the one or more standard elements should be downloaded. Therefore, if the client computer system 210 is unable to communicate with the alternative device 220 in its current operating mode, it will determine that the one or more standard elements of the web page should be downloaded from the device 100 (as this will provide the first positive response to the access attempt).

As an example, in the first configuration A, the client computer system 210 may attempt to access the first test element from the device 100 via the mobile network 230 and may attempt to access the second test element from the alternative device 220 via the other network 240. Due to the different characteristics of the mobile network 230 and other network 240, it may be expected that the alternative device 220 will respond to the attempt to access the second test element before the device 100 responds to the attempt to access the first test element. Therefore, in the first configuration A, the client computer system 210 may determine to download the one or more standard elements of the web page from the alternative device 220. However, in the second configuration B, the client system 210 may attempt to access the first test element from the device 100 via the direct wired connection 250 and may attempt to access the second test element from the alternative device 220 via the mobile network 230. Again, due to the different characteristics of the direct wired connection 250 and the mobile network 230, it may be expected that the device 100 will respond to the attempt to access the first test element before the alternative device 220 responds to the attempt to access the second test element. Indeed, in this second configuration B, the client computer system 210 may not be able to communicate with the alternative device 220 at all. Therefore, in this second configuration B, the client computer system 210 may determine to download the one or more standard elements of the web page from the device 100.

It will be appreciated that there are many different ways in which the determination of which device to download the one or more standard elements from may be made based on the outcome of the attempts to access the first and second test elements. For example, the access attempts may include the retrieval of the test elements from the respective devices. In this case, the time that it takes for each of the test elements to be retrieved may be monitored in order to assess a throughput for retrieving data from each of the first and second devices. The throughput may be calculated as follows:

$$\text{Throughput} = \frac{\text{Size of Respective Test Item}}{\text{Time Taken to Retrieve}}$$

Where the first and second test elements are the same as each other, the available throughput may be determined by simply assessing which of the test elements was retrieved quickest (or first if the attempts to access both test elements occurred substantially simultaneously). The test elements that are attempted to be retrieved in steps 330 and 340 of the method 300 may be one of the standard elements of the web page or may be a test file specific for that purpose. Where the test elements are standard elements of the web pages, their use as test elements may serve to reduce the number of standard elements that remain to be retrieved. However, the test elements need not be elements of the web page at all and may instead simply exist for the purposes of allowing access attempts solely for the purposes of performing the method 300.

At a step 360 of the method 300, the client computer system 210 downloads the one or more standard elements from the device determined at step 350 and downloads the at least one variable element from the device 100. Step 360 may be performed as part of a final step resulting from running the initial script, or may alternatively be performed as part of the browsers normal operation (for example, the script 350 may alter the structure of the web page to indicate the locations that the one or more standard elements may be retrieved from as determined at step 350 enabling the browser to retrieve the one or more standard elements at step 360 in the usual manner).

Finally, at a step 370 of the method 300, the client computer system 210 displays the web page including the one or more standard elements and the at least one variable element.

In this manner, the client computer system 210 is enabled to retrieve the status information of the one or more devices 100 in the most efficient manner, regardless of which mode (A or B) the client computer system 210 is operating in. Therefore, when operating remotely in mode A, the client computer system 210 is able to retrieve standard elements of the web page from an alternative device 220 which is better placed to provide the standard elements to the client computer system 210. This can avoid issues that may arise from the use of the mobile network 230 to communicate with the device 100 which can result in slow retrieval times or even may render certain standard elements irretrievable. Furthermore, it can significantly reduce the load that is placed on the mobile network 230 by a system involving a large number of devices 100 all being remotely managed (i.e. monitored and/or configured). Meanwhile, when operating locally in mode B, the client computer system 210 is able to retrieve the standard elements of the web page from the device 100 which is better placed to provide the standard elements to the client computer system 210 in this mode. Furthermore, through the use of a script to cause the client computer system 210 to retrieve the standard elements in this manner, any computer system may be used as the client computer system 210 as all that is needed is a relatively standard browser program.

Note the method described is not simply to use a conventional proxy server implementing web caches to reduce the amount of data transmitted across the network to and from a web server, as well as to improve the speed with which a web page and its associated resources may be retrieved by a client computer system is known. Such proxy servers act as an intermediary between the client computer system and the web server. Requests for web pages are passed from the client computer system to the proxy server and subsequently from the proxy server to the web server. Responses are sent from the web server back to the proxy server and subsequently from the web server back to the client computer system. Proxy servers may act as a web cache by storing local copies of a web page and/or one or more of the resources that form part of a web page when they are retrieved from the web server following a request by a client computer system. This means that when a subsequent request is made (possibly by a different client computer system than that which made the original request), the proxy server can simply return the locally stored copies, without having to send the request to the web server and wait for its response.

However, proxy servers are typically not effective where there are a large number of devices, each serving their own web page which may be visited infrequently. These problems are compounded yet further by the fact that most devices enable the status web page to be retrieved locally via a wired connection, as well as remotely via a wireless connection. Since it cannot be relied on that a locally connected computer system (e.g. when a technician is maintaining the machine in the field) has any other network connections, the internal web server must be able to provide substantially all of the required elements of the web page itself as, otherwise, these elements may not be able to be provided to a user connecting to the device locally. Therefore, existing proxy servers must treat the web page of each device separately, meaning that it is unlikely that a particular proxy server will have already cached the elements of the web page for a particular device (amongst the large numbers of devices).

Instead, by identifying standard and variable elements and providing a script to ensure that the elements are downloaded from the most appropriate server, the script running in the client device itself ensures an improved download pattern. It is not necessary to rely on automatic proxy servers which may or may not be present somewhere in the network between the client device 210 and web server in device 100.

The inventors are aware of a potential disadvantage of downloading resources from multiple locations, in that the approach can lead to vulnerabilities able to be exploited, such as cross-site scripting.

The multiple resources may be accessed using an approach known as cross-origin resource sharing. This allows for communication between browser and server of instructions as to whether to allow resources from a particular location. To determine whether the resources may be used, in a way that addresses the issue of cross site scripting, a number of approaches may be used.

One approach is for the device 100 to calculate a check code, in the form of a checksum or MD5 hash, of the local copy of the standard resources that may be downloaded from the alternative site. The device 100 can then download over time—even over a slow link—a copy of the resources from the alternative device 210 and calculate the check code from these downloaded resources. The device 100 can then allow (using cross-origin resource sharing) the browser to download resources from the alternative device 210 if and only if the check codes match.

In another option, a check code is created, in the form of a checksum or MD5 hash, of the local copy of the standard elements that may be pulled from the alternative device. This check code is sent to the browser, which compares the check code with a corresponding check code of resources downloaded from the alternative site and only allows use of those resources if the check codes match.

Alternatively, the script downloaded to the browser may include code for downloading the resources from the alternative device 210, calculating a check code from the downloaded resources, and sending the calculated check code back to the device 100. The device 100 then compares this check code with a known value of the check code which then signals the browser in the client device to allow the use of the resources if the check codes match or not to allow the use of the resources if the check codes do not match.

Figure 4:
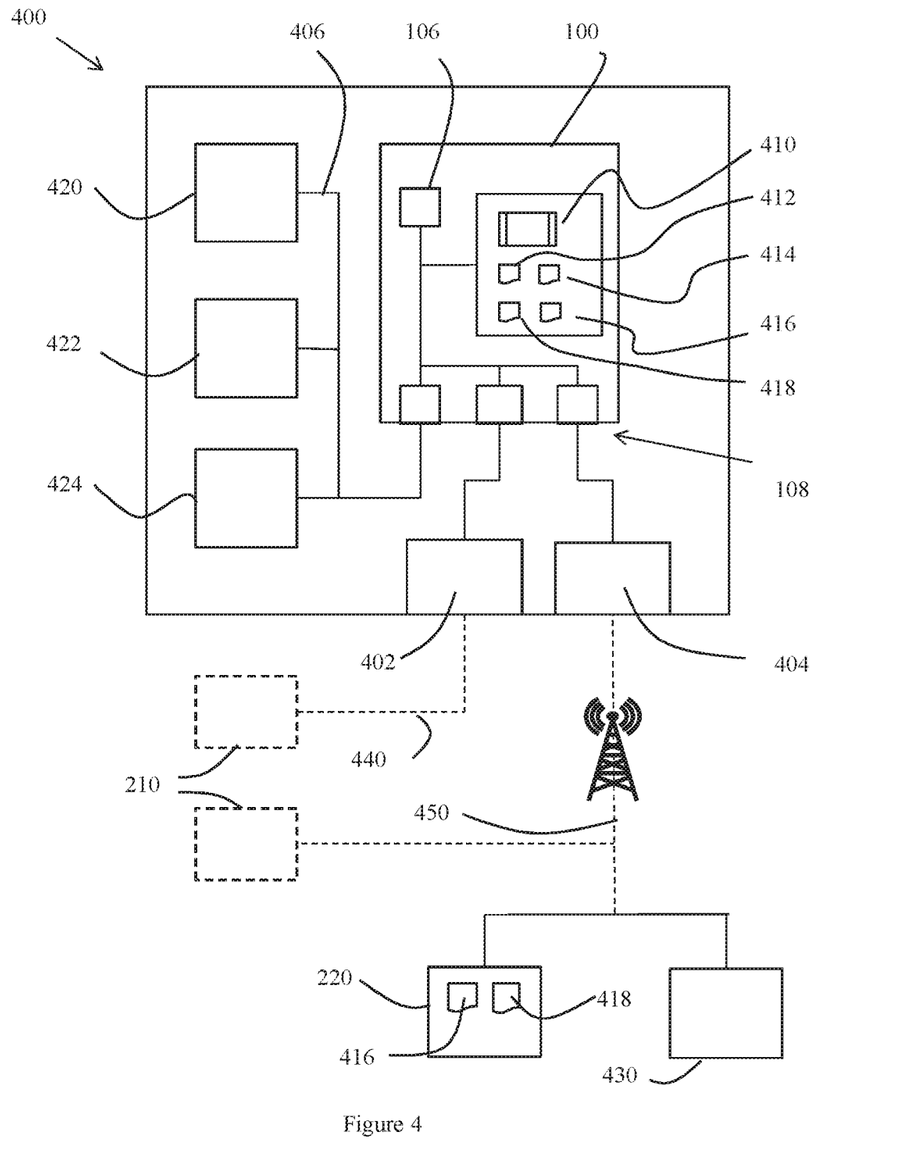
FIG. 4 schematically illustrates apparatus including a further exemplary device according to an embodiment of the invention.
Figure 5:
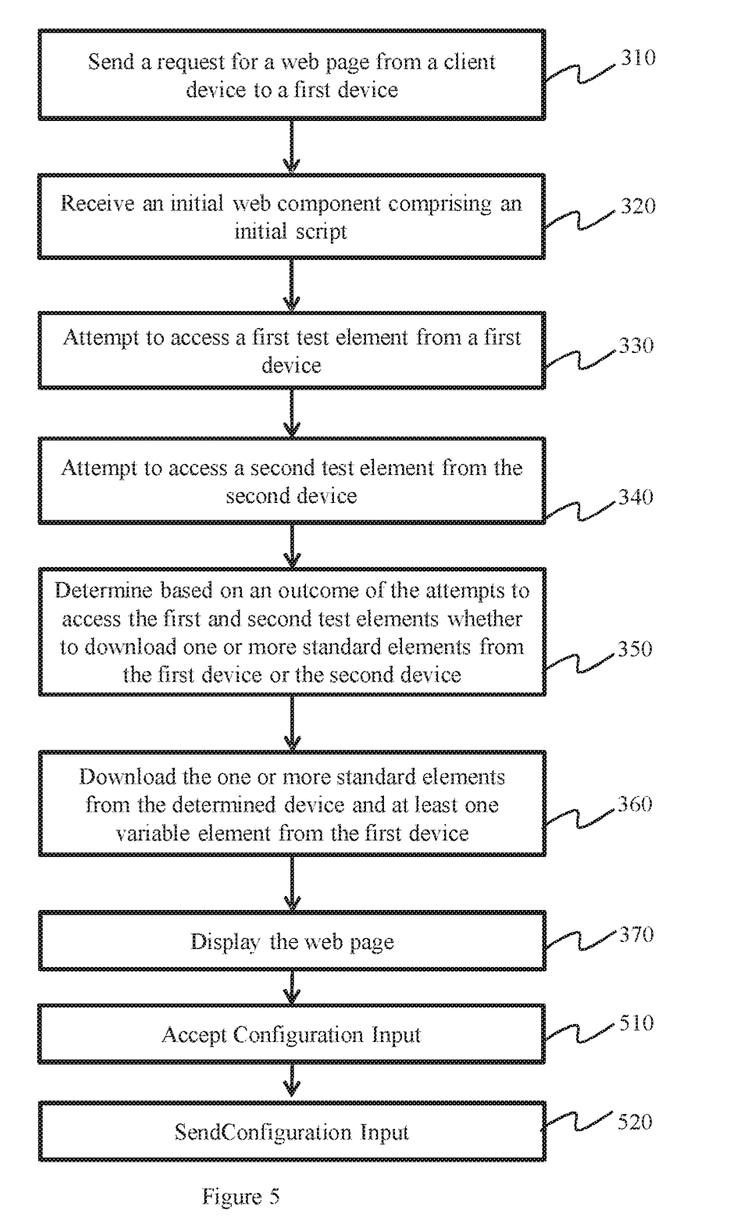
FIG. 5 schematically illustrates a method of operating the device of FIG. 4.

In an alternative specific embodiment of the invention, referring to FIGS. 4 and 5, the device 100 is a router.

The router 100 has multiple interfaces 108. One of these interfaces 108 is connected to a local area network, LAN, 406 in apparatus 400 in which the router 100 is embedded. One of these interfaces 108 is connected to a wired connection port 402. Another interface 108 is connected to a wireless modem 404. In the embodiment, the wireless modem 404 is arranged to connect preferentially through a GPRS (2G) service to keep costs low.

Embedded in the router 100 is a web server indicated schematically by web browser software 410 adapted to run in processor 106 and web page elements 412, 414, 416, 418 stored in memory 104 of the router.

The apparatus 400 in which the router is embedded has a number of further components 420, 422, 424 connected by means of the local area network 406. These further components provide the functionality of the apparatus 400. In the embodiment described, these further components deliver a smart meter solution and include a processor 420, memory 422 and electricity meter 424. The same router chip may of course be used in other types of apparatus.

In order for the smart meter to function, the further components 420, 422, 424 need to be able to communicate with a web server 430 operated by a utilities company. This is achieved via the LAN 406, router 100, and then either a wired link on wired connection port 402 or a wireless link through wireless modem 404.

In use, there may be a need to update the router configuration, for example when the web server 430 is moved to a different network address. This is achieved by a user operating a client device 210.

If the user is local to the apparatus 400, the user connects the client device 210 to the wired connection port 402 by wired connection 440. The user then uses a web browser in the client device 210 to connect to web server 410. This web server 410 delivers an initial web page element 412 including an initial script which is executed in the web browser in the client device 210.

The initial script then runs to carry out steps 330 to 370 illustrated in FIG. 3 in the client device 210. In the case where the user is local to the apparatus, in general the test element is downloaded more quickly directly from the web server 410 in the client side apparatus than from alternative server 220 since the connection to the web server 410 is through a direct wired link. The script thus downloads the web page elements 414, 416, 418 from the memory 104 of the router to the client device 210.

If the user is remote to the apparatus 400, the user connects the client device 210 to the router 100 using a wireless connection 450 through wireless modem 404. This web server 410 delivers an initial web page element 412 through the wireless link—the initial web page element 412 includes an initial script which is executed in the web browser in the client device 210.

The initial script then runs to carry out steps 330 to 370 illustrated in FIG. 5 in the client device 210. In this case the client device 210 is not local to the apparatus is not local to the apparatus so typically the test element is downloaded more quickly from alternative server 220. The script thus downloads most web page elements 416, 418 from alternative server 220. However, one web page element 414 includes router specific configuration information and this web page element 414 is downloaded through the wireless link.

No environment information is required by the initial script since the determination of where to obtain the web page elements 414, 416, 418 occurs directly in the script in the client device 210.

Once the web pages elements 412, 414, 416, 418 are all downloaded to the client device 210 the client device displays a web page used for configuration of the router made up of the web page elements 412, 414, 416, 418.

The configuration web page displays configuration information and the user then inputs configuration information to the configuration web page (Step 510, FIG. 5). The script then passes this configuration information back to the web server 410 (step 520, FIG. 5) which updates the router 100.

The apparatus 100 can then continue to operate with the router 100 in the new configuration. The electricity meter 424 takes data which is processed by processor 420 and the information passed back to web server 430 using the router.

It will be noted that by using router 100 in apparatus 400 the apparatus 400 can be complex, with multiple components all connected through LAN 406. In alternative embodiments, multiple LANs may be provided if required.

Figure 6:
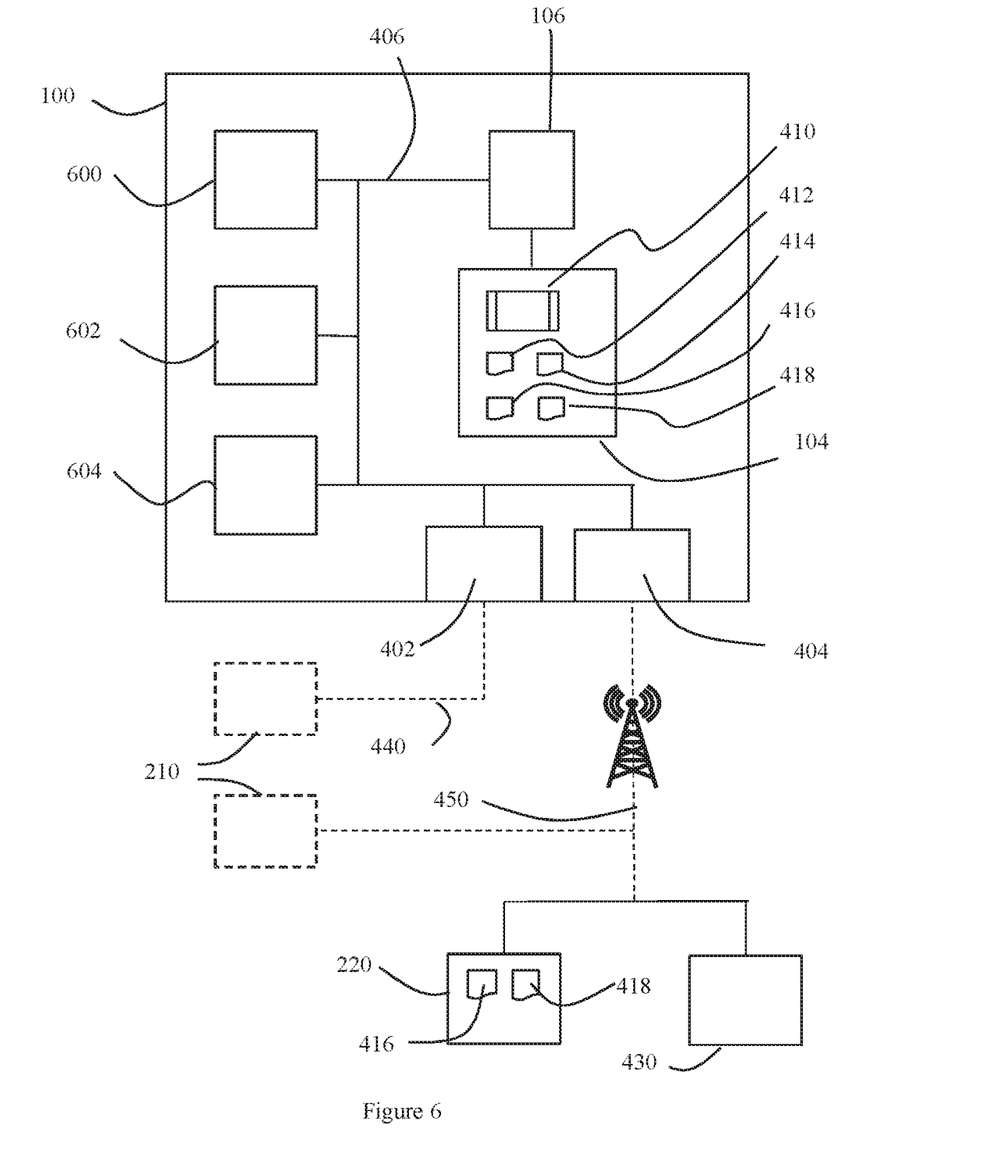
FIG. 6 schematically illustrates a further exemplary device according to the invention.

In an alternative specific embodiment, the device 100 is a coffee machine 100 illustrated in FIG. 6. The device includes processor 106, memory 104, as well as LAN 400 which is connected to a number of components 600, 602, 604 which include a water heater, cup dispenser, ingredient dispenser and other components. The LAN 400 is also connected to wireless modem 404 and wired connection port 402.

The memory 104 includes web browser software 410 and web page elements 412, 414, 416, 418.

In use, there may be a need to check stock levels of the coffee machine. This is achieved by a user operating a client device 210.

If the user is local to the apparatus 400, the user connects the client device 210 to the wired connection port 402 by wired connection 440. The user then uses a web browser in the client device 210 to connect to web server 410 which in this instance is run in processor 106. This web server 410 delivers an initial web page element 412 including an initial script which is executed in the web browser in the client device 210.

The initial script then runs to carry out steps 330 to 370 illustrated in FIG. 3 in the client device 210. In the case where the user is local to the coffee machine 100, in general the test element is downloaded more quickly directly from the web server 410 in the client side apparatus than from alternative server 220 since the connection to the web server 410 is through a direct wired link. The script thus downloads the web page elements 414, 416, 418 from the memory 104 of the coffee machine 100 to the client device 210.

If the user is remote to the coffee machine 100, the user connects the client device 210 to the router 100 using a wireless connection through wireless modem 404. This web server 410 delivers an initial web page element 412 through the wireless link—the initial web page element 412 includes an initial script which is executed in the web browser in the client device 210.

The initial script then runs to carry out steps 330 to 370 illustrated in FIG. 3 in the client device 210. In this case the client device 210 is not local to the apparatus so typically the test element is downloaded more quickly from alternative server 220. The script thus downloads some web page elements 416, 418 from alternative server 220. However, one web page element 414 includes the necessary information about the supplies in the coffee machine 100 and this is not available from alternative server and instead is downloaded through the wireless link from the coffee machine itself.

Once the web page elements 412, 414, 416, 418 are all downloaded to the client device 210 the client device displays a web page displaying the information about the supplies in the coffee machine from the downloaded web page element 414 together with graphical and other information in the other web page elements 416, 418.

Note that the device 100 to which the invention is applied may be a single chip such as the router chip 100 in the arrangement of FIG. 4, a large apparatus such as the coffee machine of the arrangement of FIG. 6, or even a part of a device or chip.

It will be appreciated that the embodiments of the invention that have been discussed above are merely exemplary and that various modifications or adaptations may be made without departing from the scope of the invention as set out by the appended claims.

In particular, although the figures and the discussion thereof provide exemplary devices, systems and methods, these are presented merely to provide a useful reference in discussing various aspects of the invention. For example, the invention may be readily applied using different types and combinations of network connections to communicate between the client computer system 210 and the device 100, as well as between the client computer system 210 and the alternative device 220. For example, the networks could be any of a Personal Area Network (PAN), Local Area Network (LAN), Metropolitan Area Network (MAN), Wide Area Network (WAN), Enterprise Private Network (EPN), Virtual Private Network (VPN), an Internetwork or the Internet. Similarly, the networks may be implemented as wired networks, for example using coaxial cable, twisted pair or optical fibre for communication. Alternatively or additionally, the networks may be wireless networks, for example using the WiFi, Bluetooth or ZigBee standards, or may be a cellular/mobile networks, for example using the GSM, GPRS, 3G, LTE, 4G or WiMax standards. It will be appreciated that the examples listed above are not exhaustive and that other types of networks may be used. It will also be appreciated that each network may comprise a mixture of technologies. Similarly, devices 100 having different numbers (greater or fewer) of components and which connect to and provide routing functionality between different numbers and types of networks may be used. Also, the network topology of the system 200 may differ from that shown with different numbers and types of networks being involved in the connections between the client computer system 210 and the device 100, as well as between the client computer system 210 and the alternative device 220. Merely as an example, the client computer system 210 may comprise two network interfaces, one of which is used to communicate with a first network, such as mobile network 230, to connect to the device 100, and the other being used to communicate independently with a second network, such a local wired or wireless network, in order to connect to the alternative device 220.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage.

The invention claimed is:

1. A method for retrieving status information of a first device from a client device, the first device comprising an integral web server arranged to provide a web page comprising one or more standard elements and at least one variable element specific to the first device including information specific to a current operating state of the first device, wherein the one or more standard elements are also available for download from a second device with which the client device can communicate, and wherein the client device is connected to the first device over a first network route comprising a mobile network and is connected to the second device over a second network route comprising a wired network, the method comprising:

sending a request for the web page from the client device to the first device;

receiving at the client device, from the first device, an initial web component comprising an initial script;

running the initial script at the client device to:

attempt to access, over the first network route, a first test element from the first device;

attempt to access, over the second network route, a second test element from a second device;

determine a device, based on an outcome of the attempts to access the first test element and the second test element, wherein the determined device is one of the first device or the second device; and         download the one or more standard elements from the determined device and the at least one variable element from the first device; and     displaying the web page on the client device.

2. The method according to claim 1, wherein the determination of the determined device is based, at least in part, on an assessment of a respective available throughput for retrieving elements from each of the first and second devices based on a respective time taken to retrieve each of the first and second test elements.

3. The method according to claim 1 wherein the web page is a configuration web page, the method further comprising:

accepting configuration information input at the web page on the client device; and     sending the configuration information to the client device based on the configuration input.

4. The method according to claim 1, wherein the first and second test elements are the same as each other and correspond to one of the one or more standard elements of the web page.

5. The method according to claim 1, further comprising calculating a check code in the form of a checksum or hash code from the standard elements on the first device, calculating the same check code from the standard elements on the second device, and allowing the use of the elements from the second device in the step of displaying the web page only if the check codes match.

6. A first device for providing status information to a client device, the device comprising:

an integral web server configured to provide a web page comprising one or more standard elements and at least one variable element specific to the first device including the status information specific to a current operating state of the first device to the client device in response to receiving a request from the client device, wherein the one or more standard elements are also available for download from a second device with which the client device can communicate, and wherein the client device is connected to the first device over a first network route comprising a mobile network and is connected to the second device over a second network route comprising only a wired network, wherein providing the web page includes providing an initial web component comprising an initial script which, when run by the client device, causes the client device to:

attempt to access, over the first network route, a first test element from the first device;

attempt to access, over the second network route, a second test element from a second device;

determine a determined device, based on an outcome of the attempts to access the first test element and the second test element, wherein the determined device is one of the first device or the second device; and         download the one or more standard elements from the determined device and the at least one variable element from the first device.

7. The device according to claim 6, further comprising:

a first network interface configured to enable the device to communicate via a first network; and a second network interface configured to enable the device to communicate via a second network; and wherein the integral web server is further configured to provide the web page in response to a request received from the client device via either of the network interfaces.

8. The device according to claim 7, wherein the device is further configured to function as a router to forward data packets between the first network and the second network.

9. The device according to claim 8, wherein the device is arranged to base its operation, at least in part, on configuration data stored within the device and wherein the at least one variable element of the web page comprises the configuration data, the web page being further configured to enable the configuration data to be modified at the client device and sent to the device for providing status information to update the configuration of the device.

10. The device according to claim 7, wherein the device is arranged to base its operation, at least in part, on configuration data stored within the device and wherein the at least one variable element of the web page comprises the configuration data, the web page being further configured to enable the configuration data to be modified at the client device and sent to the device for providing status information to update the configuration of the device.

11. The device according to claim 6, wherein the device is arranged to base its operation, at least in part, on configuration data stored within the device and wherein the at least one variable element of the web page comprises the configuration data, the web page being further configured to enable the configuration data to be modified at the client device and sent to the device for providing status information to update the configuration of the device.

12. A system for providing status information from one or more devices to a client device comprising:

one or more devices according to claim 6, wherein the one or more standard elements are common to the respective web pages of all of the one or more devices; and     a second device configured to make the one or more standard elements available for download.

13. The system of claim 12, wherein the one or more devices comprises a plurality of devices.

14. A user interface controller comprising:

an interface comprising:

one or more standard elements, wherein the one or more standard elements are also available for download from a second device with which a client device can communicate, and wherein the client device is connected to a first device over a first network route comprising a mobile network and is connected to the second device over a second network route comprising only a wired network;

at least one variable element specific to the first device to which a web page relates and including information specific to a current operating state of the first device; and an initial web component comprising a script which, when executed by a processor of a device receiving the web page, causes the device to:
- attempt to access, over the first network route, a first test element from the first device;
- attempt to access, over the second network route, a second test element from a second device;
- determine a device, based on an outcome of the attempts to access the first test element and the second test element, wherein the determined device is one of the first device or the second device; and
- download the one or more standard elements from the determined device and the at least one variable element from the first device.

15. The user interface controller according to claim 14, wherein the one or more standard elements comprise one or more of: an image, an animation, a video, a sound file, a script or a style sheet, and wherein the variable element comprises status and/or configuration data associated with the operation of the first device.

16. The user interface controller according to claim 15, wherein the script, when executed by a processor of a client device receiving the web page, further causes the client device to:
- accept configuration information input; and
- send the configuration information to the first device based on the configuration input.

17. The user interface controller according to claim 14, wherein the script, when executed by a processor of a client device receiving the web page, further causes the client device to:
- accept configuration information input; and
- send the configuration information to the first device based on the configuration input.

\* \* \* \* \*